(12) United States Patent
Selle

(10) Patent No.: US 7,686,376 B2
(45) Date of Patent: Mar. 30, 2010

(54) MOTOR VEHICLE WITH A MOVABLE COVER SECTION FOR THE BODY

(75) Inventor: Heinrich Selle, Bad Oeynhausen (DE)

(73) Assignee: Wilhelm Karmann GmbH i.I, Osnabrueck ( * ) Notice: Subject to any disclaimer, the term of this patent is extended or adjusted under 35 U.S.C. 154(b) by 167 days.

(21) Appl. No.: 11/722,535

(22) PCT Filed: Nov. 29, 2005

(86) PCT No.: PCT/DE2005/002147

§ 371 (c)(1),
(2), (4) Date: Jun. 22, 2007

(87) PCT Pub. No.: WO2006/066526

PCT Pub. Date: Jun. 29, 2006

(65) Prior Publication Data

US 2008/0203770 A1     Aug. 28, 2008

(30) Foreign Application Priority Data

Dec. 22, 2004 (DE) .................. 10 2004 061 828

(51) Int. Cl.
*B60J 7/20* (2006.01)
(52) U.S. Cl. .................. 296/107.08; 296/136.06; 296/136.05
(58) Field of Classification Search .......... 296/136.06, 296/128, 107.08, 136.05, 76; 49/192, 280, 49/281, 300, 301
See application file for complete search history.

(56) References Cited

U.S. PATENT DOCUMENTS

| 4,655,004 | A | * | 4/1987 | Caillet ........................ 49/280 |
| 5,655,331 | A | * | 8/1997 | Schrader et al. .............. 49/280 |
| 6,270,144 | B1 | * | 8/2001 | Schenk .................. 296/107.08 |
| 7,261,363 | B2 | * | 8/2007 | Obendiek .............. 296/107.08 |
| 7,392,873 | B2 | * | 7/2008 | Habacker .................. 180/69.2 |
| 2002/0093218 | A1 | * | 7/2002 | Weissmueller et al. ...... 296/136 |
| 2003/0025350 | A1 | * | 2/2003 | Sande .................. 296/107.08 |
| 2005/0046221 | A1 | * | 3/2005 | Guillez et al. ................. 296/76 |
| 2006/0043759 | A1 | * | 3/2006 | Habacker .................... 296/128 |
| 2006/0131920 | A1 | * | 6/2006 | Queveau et al. ........ 296/107.08 |
| 2007/0029833 | A1 | * | 2/2007 | Kuhr ........................... 296/76 |

FOREIGN PATENT DOCUMENTS

| DE | 8913486 U1 | 1/1990 |
| EP | 1084885 A1 | 3/2001 |

OTHER PUBLICATIONS

Machine translation of DE8913486.*

* cited by examiner

*Primary Examiner*—Jason S Morrow
(74) *Attorney, Agent, or Firm*—Quinn Law Group, PLLC

(57) ABSTRACT

A motor vehicle with a roof that is at least partially moveable and can be stowed in the body beneath a cover section. The cover section can be moved upward in a pivoting motion, opening up toward the rear to reveal a stowage opening for the roof sections or for the entire roof. A drive element is provided that lies in a longitudinal vertical plane of the vehicle. When the drive element is in close proximity to its retracted position, it actuates a moveable power pull-down device for the cover which comprises at least one pivoting control arm disposed on the body by acting on the pivoting control arm.

11 Claims, 18 Drawing Sheets

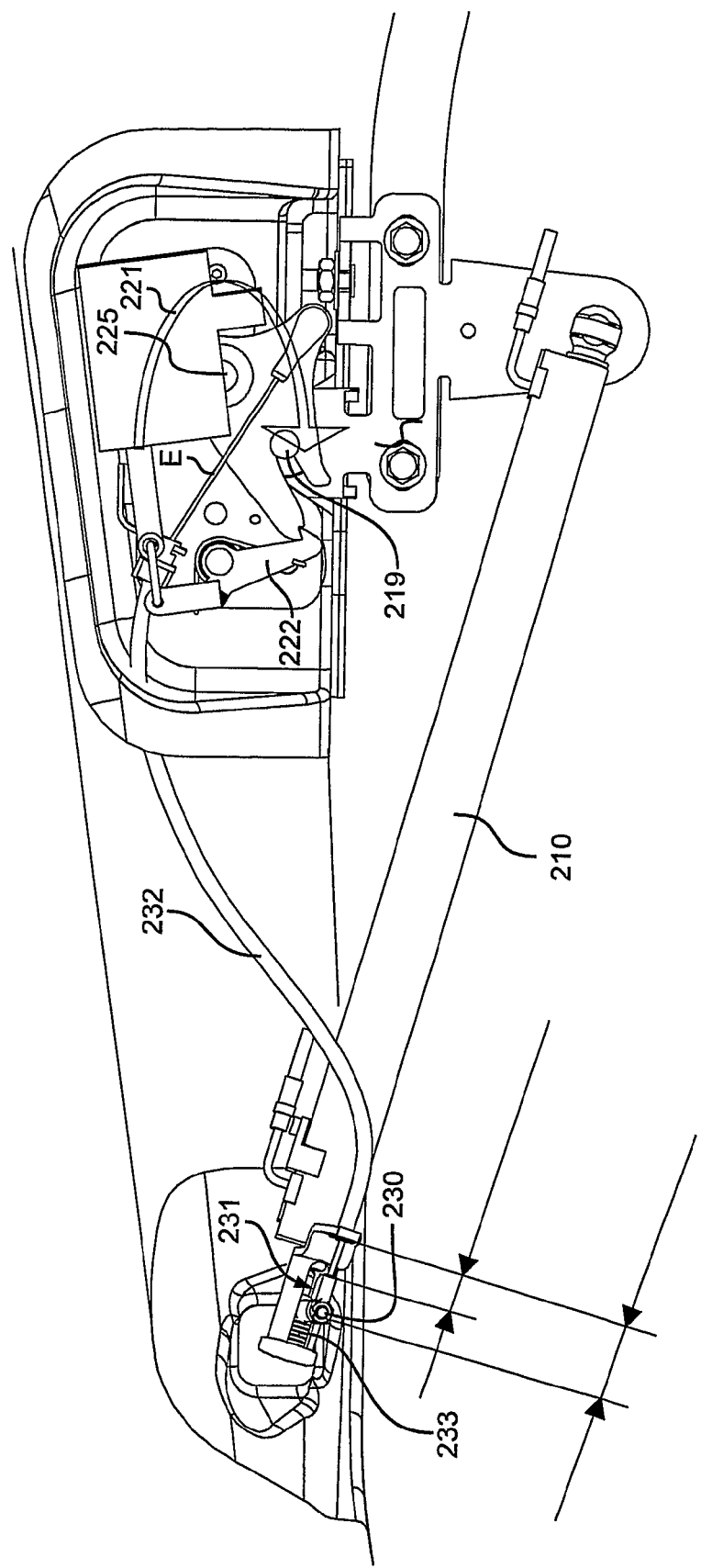

MOTOR VEHICLE WITH A MOVABLE COVER SECTION FOR THE BODY

CROSS-REFERENCE TO RELATED APPLICATION(S)

This application is a U.S. National Phase of International Application No. PCT/DE 2005/002147, filed Nov. 29, 2005, which claims priority to German 10 2004 061 828.3 filed Dec. 22, 2004. The entire contents of the above identified applications are incorporated herein by reference.

TECHNICAL FIELD

The invention relates to a motor vehicle with an at least partially movable roof that can be stowed in the body underneath a cover section.

BACKGROUND OF THE INVENTION

The technique of moving a cover section of this type by means of drive elements, such as hydraulic cylinders, located in the sides of the body is known. With certain body shapes it is desirable for the drive elements to lie relatively low in the body in order to prevent the drive elements from colliding with lateral wheel housings, and in order to utilize available space efficiently with minimum decrease in the remaining trunk space. With this type of flat arrangement, especially during the final phase of closure of the cover section, the problem can arise that either the angle between the line that connects the point of force of the drive element to the pivoting axis of the cover section and the direction of force becomes very small and/or the line that connects the point of applied force and the pivoting axis of the cover section is very short, therefore the amount of torque applied by the drive element to the cover section is very small. This makes closing the cover section harder especially because in this process force must frequently also be applied against the elastic force of a seal, against which the closed cover section is pressing.

SUMMARY OF THE INVENTION

The object of the invention is to improve the movability of the cover section when it is nearly closed, with at least one drive element having a line of force that acts low in the body.

With the configuration of the invention of a power pull-down device, the tractive force of a drive element oriented essentially toward the front in the direction of travel is converted at least partially to a downward force acting against the front end of the cover section, thereby facilitating its closure. The power pull-down device can be moved by the drive element for the cover section, and thus does not require its own actuator or its own drive.

If a movable power pull-down device actuates the cover section only when the drive element is very near its retracted position, said cover section being held in a position that is beyond dead center when the drive element is fully retracted, then precisely when the power pull-down movement is near completion, a beneficial additional force is created that assists in closing the cover section.

The particularly advantageous positioning of the cover section beyond dead center in its closed position secures the cover section in a particular way that could not be accomplished by the retracted drive element alone.

Providing a pivotable gripper inside the power pull-down device allows said device to travel a considerable distance, grab a companion part for the cover section only a few degrees before the cover section reaches its closed position, and actively move said companion part downward by virtue of its pivoting.

If the drive element is configured as a hydraulic cylinder that is held on a control arm, which is capable of pivoting around a stationary axis on the body, said control arm is automatically pivoted on its axis when the hydraulic cylinder is retracted, thereby allowing the power pull-down device to be pivoted along with it. This enables a large transmission ratio.

A narrow installation space with unfavorable force lines can also be effectively utilized via at least one force-reversing adapter lever.

With a remotely actuatable lock for securing the cover section in its closed position by blocking the movement of the power pull-down device, the cover section can be reliably prevented from opening unintentionally.

The invention can be used to advantage in partially or fully convertible vehicles in which a relatively large cover section is provided, which can be pivoted in the described opening direction to reveal the stowage opening for the roof or the roof sections, and can be pivoted in the opposite direction to reveal an opening for loading or unloading luggage.

Further advantages and characterizing features of the invention are revealed in the exemplary embodiments of the object of the invention schematically illustrated in the set of drawings and described in what follows.

DESCRIPTION OF THE PREFERRED EMBODIMENTS

Figure 1:
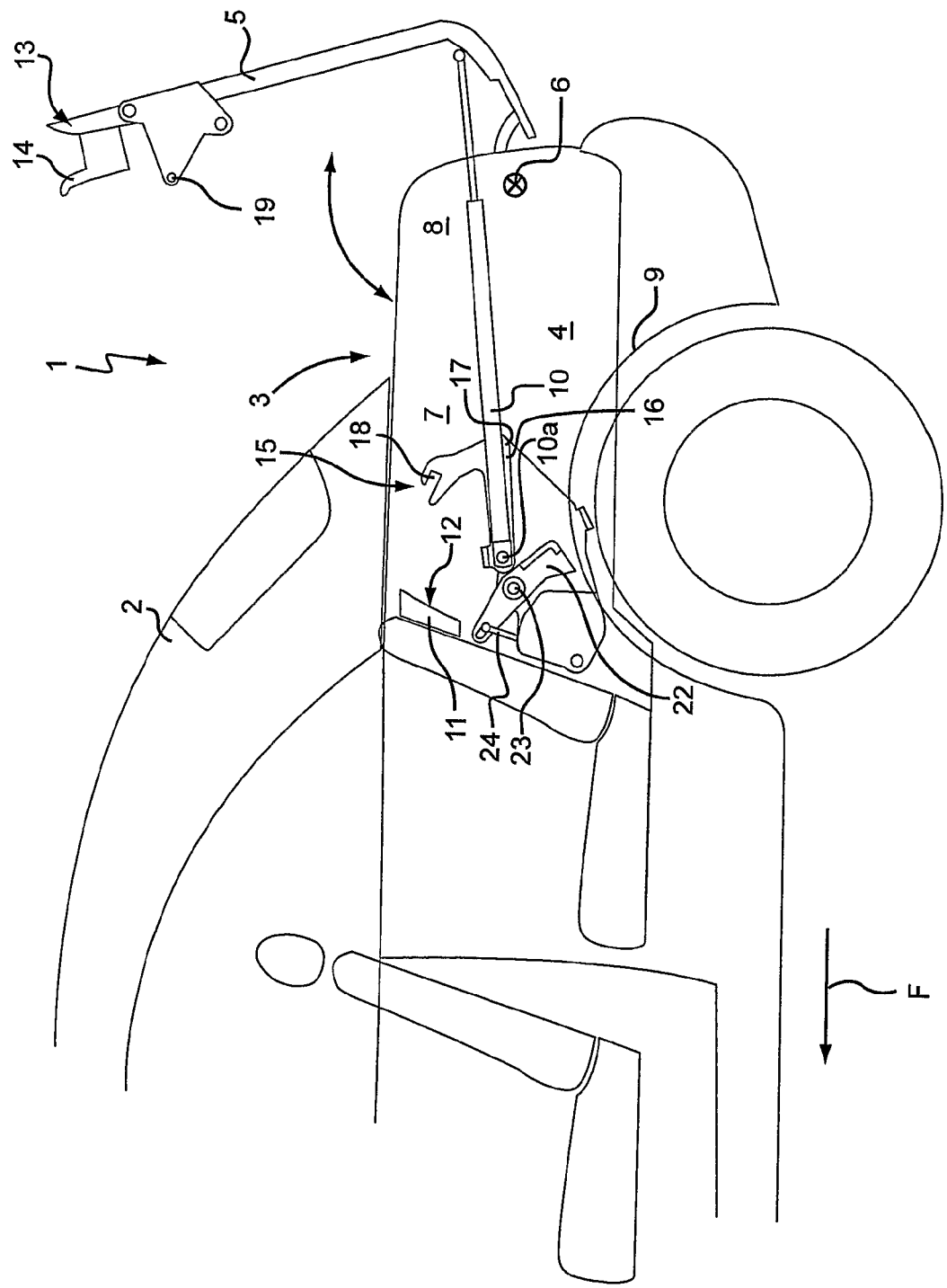
FIG. 1 a first exemplary embodiment of a motor vehicle according to the invention, in this case configured as fully convertible, with the roof closed and the cover section moved upward to reveal the stowage opening for the roof, FIG. 2 a similar view to FIG. 1 during closure of the cover section, FIG. 3 a similar view to FIG. 2 in the final phase of movement to close the cover section, in which the side arms and the guide elements have become connected to one another, FIG. 4 a similar view to FIG. 3 with the closure of the cover section further advanced, FIG. 5 a similar view to FIG. 4 with the cover section nearly closed, FIG. 6 a similar view to FIG. 5 with the cover section closed, FIG. 7 a schematic side view of the opened cover section of a second exemplary embodiment, FIG. 8 a similar view to FIG. 7 during the closure phase of the cover section, shortly before engagement of the power pull-down device, FIG. 9 the detail IX from FIG. 8, FIG. 10 a similar view to FIG. 8 during the final phase of the closing movement, FIG. 11 the detail XI from FIG. 10, FIG. 12 a similar view to FIG. 11 with the cover section in the closed position, FIG. 13 the detail XIII from FIG. 12, FIG. 14 a schematic side view of another exemplary embodiment of a power pull-down device with a beyond dead center mechanism, with the cover section open, FIG. 15 a similar view to FIG. 14 during closure of the cover section, FIG. 16 a detailed view of the engaged power pull-down device, FIG. 17 a similar view to FIG. 16 with the cover section closed, FIG. 18 a view of the entire hydraulic cylinder in the position shown in FIG. 17.
Figure 2:
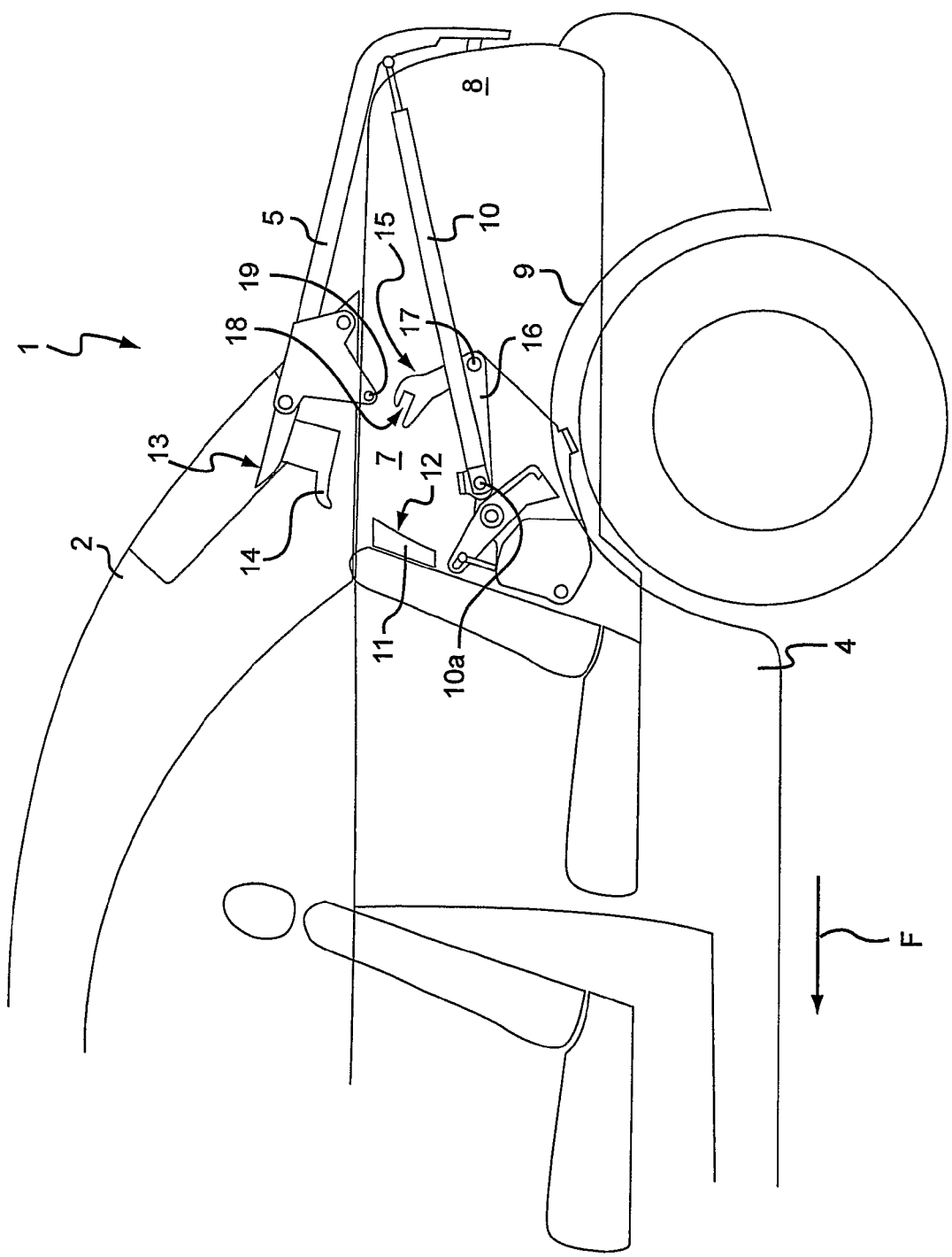
Figure 3:
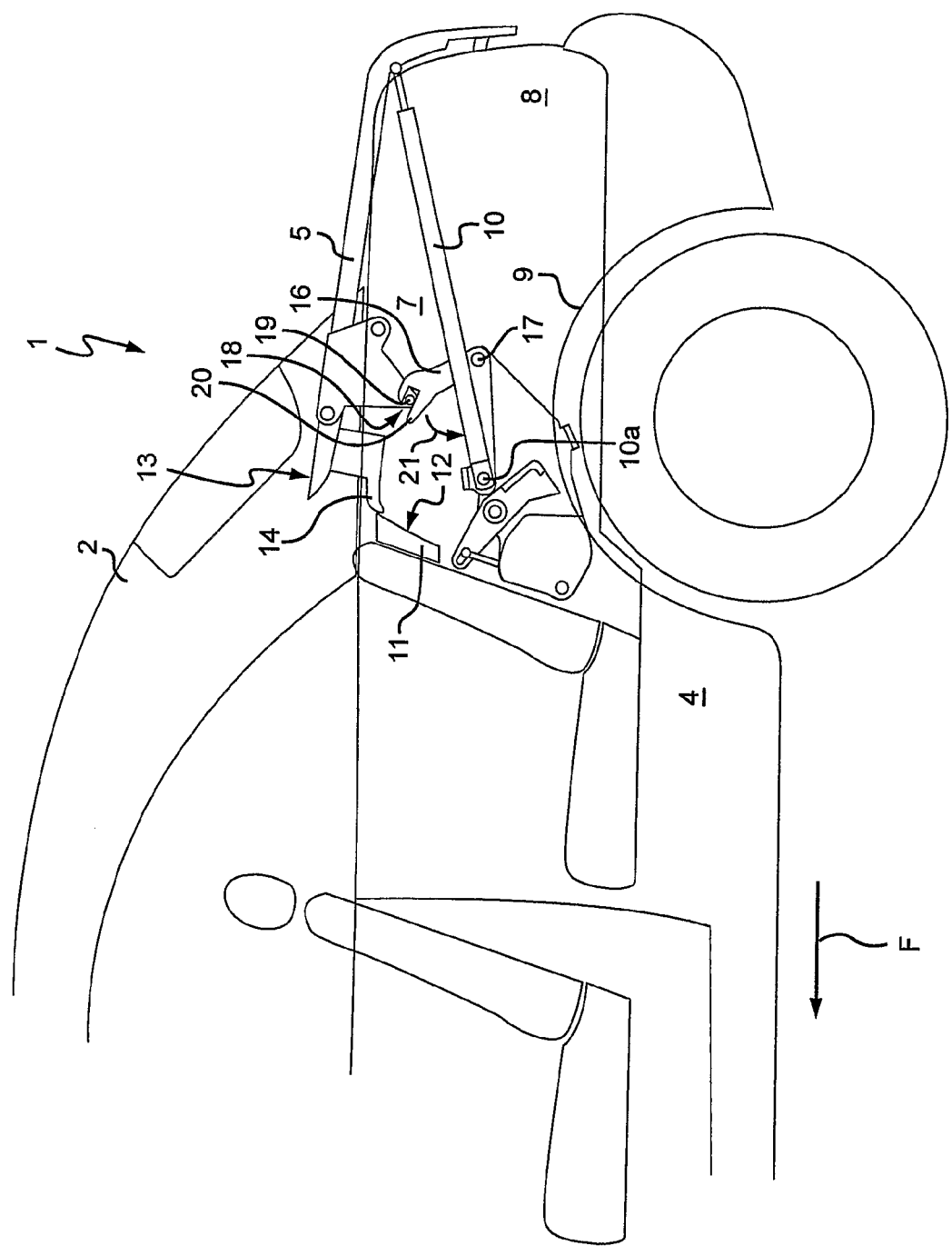
Figure 4:
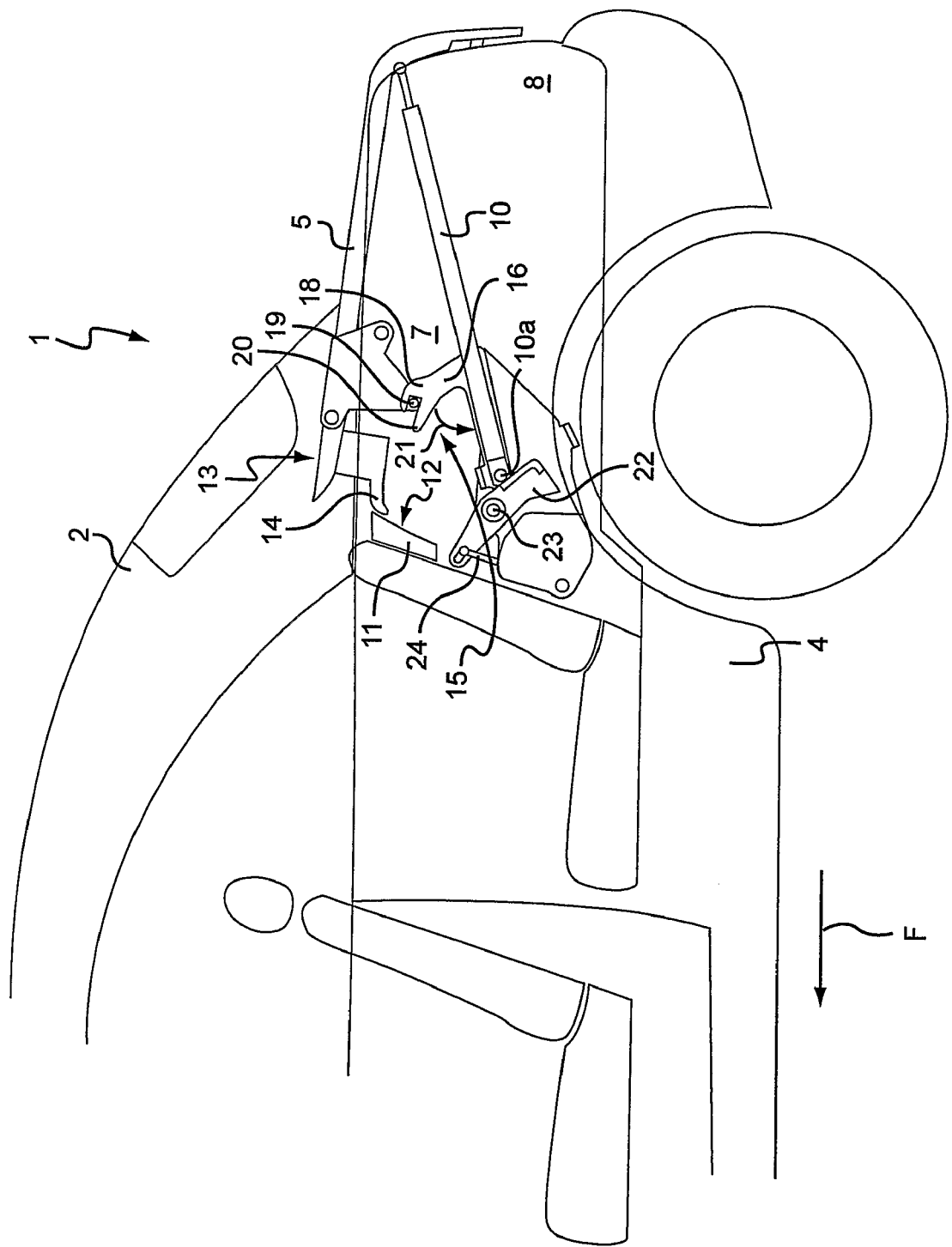

The motor vehicle 1 according to the invention can be a four- or more passenger vehicle with at least one rear bench-type seat, or a two-passenger vehicle.

The roof 2 of the vehicle can be moved upward completely or only partially, for example only that section that can be moved between two fixed lateral frame pieces. Here, a fully retractable roof 2 of a fully convertible vehicle 1 is shown. This can comprise both fixed plate sections and a soft top that is covered with a flexible cover. The section to be opened, or the entire roof 2, can be moved manually or fully or partially automatically.

Below, the features of the first exemplary embodiment are described, however these apply correspondingly to the further exemplary embodiments.

The roof 2 can be opened and stowed in the rear area of the vehicle. To accomplish this, a stowage opening 3 is provided in the body 4, which can be at least mostly closed off at the top by the cover section 5.

The cover section 5 is capable of moving between its open position (e.g. FIG. 1) and its closed position (e.g. FIG. 6) around a pivoting axis 6, which is located toward the rear of the vehicle, essentially crosswise to the direction of travel F. The movement need not be purely rotational movement. Overlapping translatory and rotary movement—for example via a multiple link—is also possible.

As shown in the first exemplary embodiment (FIG. 1 through FIG. 6), a large cover section 5 can be provided, which extends over the roof stowage space 7 and the trunk space 8, and which can be pivoted upward in the described opening direction to reveal the stowage opening for the roof 2 or the roof sections, and can be pivoted in the opposite direction to reveal an opening for loading and unloading luggage. A cover section that is capable of opening in only one pivoting direction is a possible alternative.

A lateral drive element 10, in this case configured as a hydraulic cylinder, is provided at least for the purpose of moving the cover section 5 to open or close the stowage opening 3 for the roof 2 (FIG. 1). In this exemplary embodiment the same conditions exist on both lateral sides of the vehicle, however this is not imperative.

The drive element 10 lies at least nearly in a vertical longitudinal plane of the vehicle, and flat underneath the cover section 5 in order to effectively utilize the space in a vehicle having a short rear area and a short rear overhang, and to prevent collision with the wheel housing 9. At least during the final phase of the movement to close the cover section 5 (FIG. 4 through FIG. 6), the drive element 10 lies inclined at an angle much smaller than 30° from horizontal. During this phase of movement, the cover section 5 lies inclined less than 10° to horizontal.

In the first exemplary embodiment, by way of example, in addition to the active power pull-down device 15 of the invention, which is described further below, a passive guide element 11 is arranged on each lateral side, fixed to the body, which, when the cover section 5 is in its closed position, is situated underneath the front end 13 of said cover section, and which comprises an ascending guide surface 12 that points essentially toward the rear.

The guide surface 12 is provided at the front end 13 of the cover section 5 to enable its interaction with side arms 14, which can be moved along the guide surface 12. These side arms 14 can be equipped with roller or gliding elements. At least during the final phase of the movement to close the cover section 5, the side arms 14 are pressed against the guide surfaces 12, which are structured with a component that is inclined upward, opposite the direction of travel F, causing said side arms to be automatically turned back downward, because additional forward motion is prevented by the guide surfaces 12, which are configured as sliding inclines. Because the side arms 14 do not strike the surface 12 perpendicularly, but instead are inclined relative to the direction of force, a downward force is exerted on the side arms 14 and thus on the front end 13 of the cover section 5.

In the first exemplary embodiment according to FIGS. 1 through 6, the active power pull-down device 15 encompasses an essentially L-shaped pivoting control arm 16 that is capable of pivoting around a stationary transverse axis 17 on the body of the vehicle. The hydraulic cylinder 10 is movably held on said axis via the joint 10a. The pivoting control arm 16 comprises a fork-shaped gripper 18 at the end of its leg that faces away from the articulated joint, said gripper being configured in the manner of a rotating catch for interaction with a companion part 19 of the cover section 5, such as a pin that extends crosswise relative to the vehicle 1, in close proximity to the closed position of the cover section 5.

Figure 5:
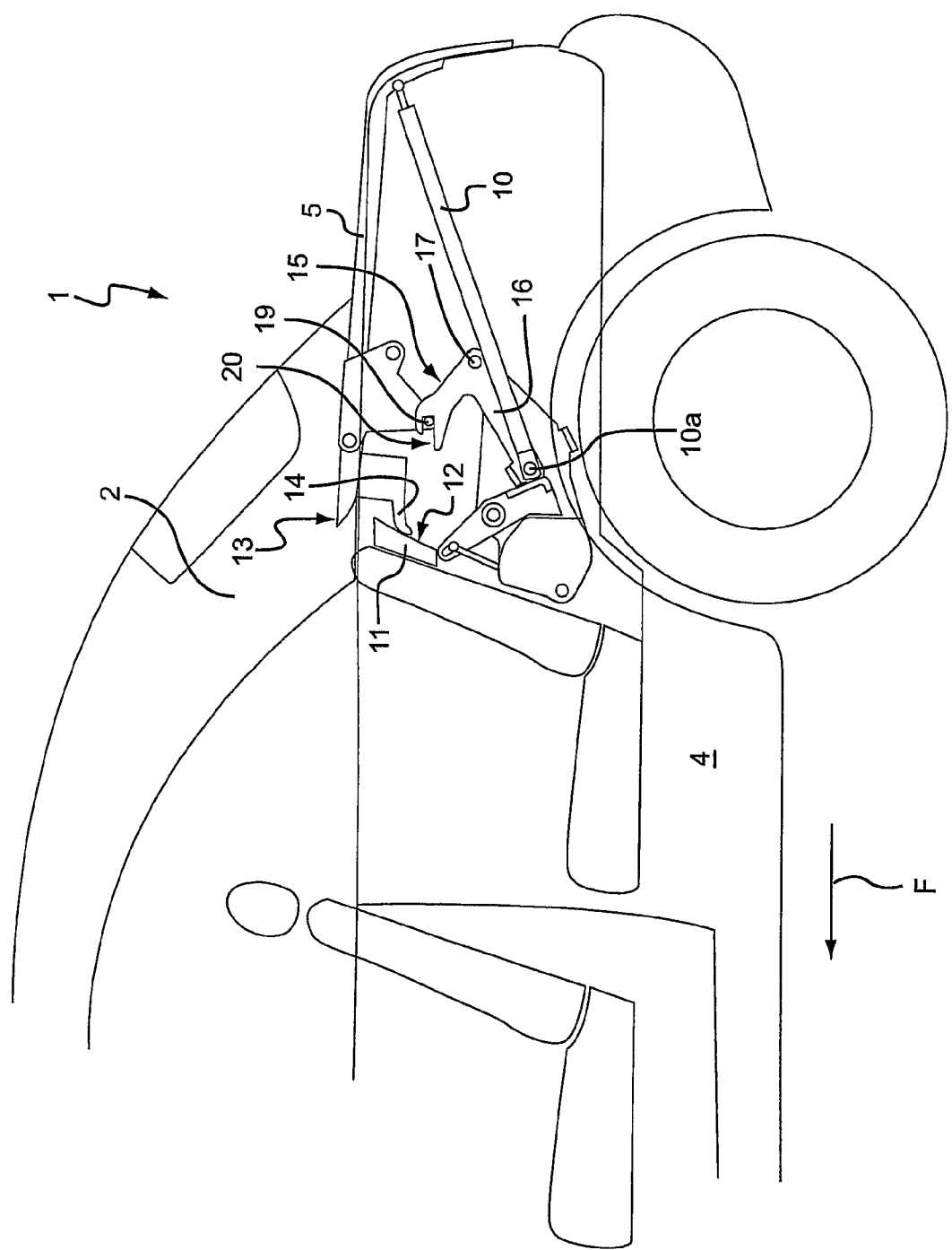
Figure 6:
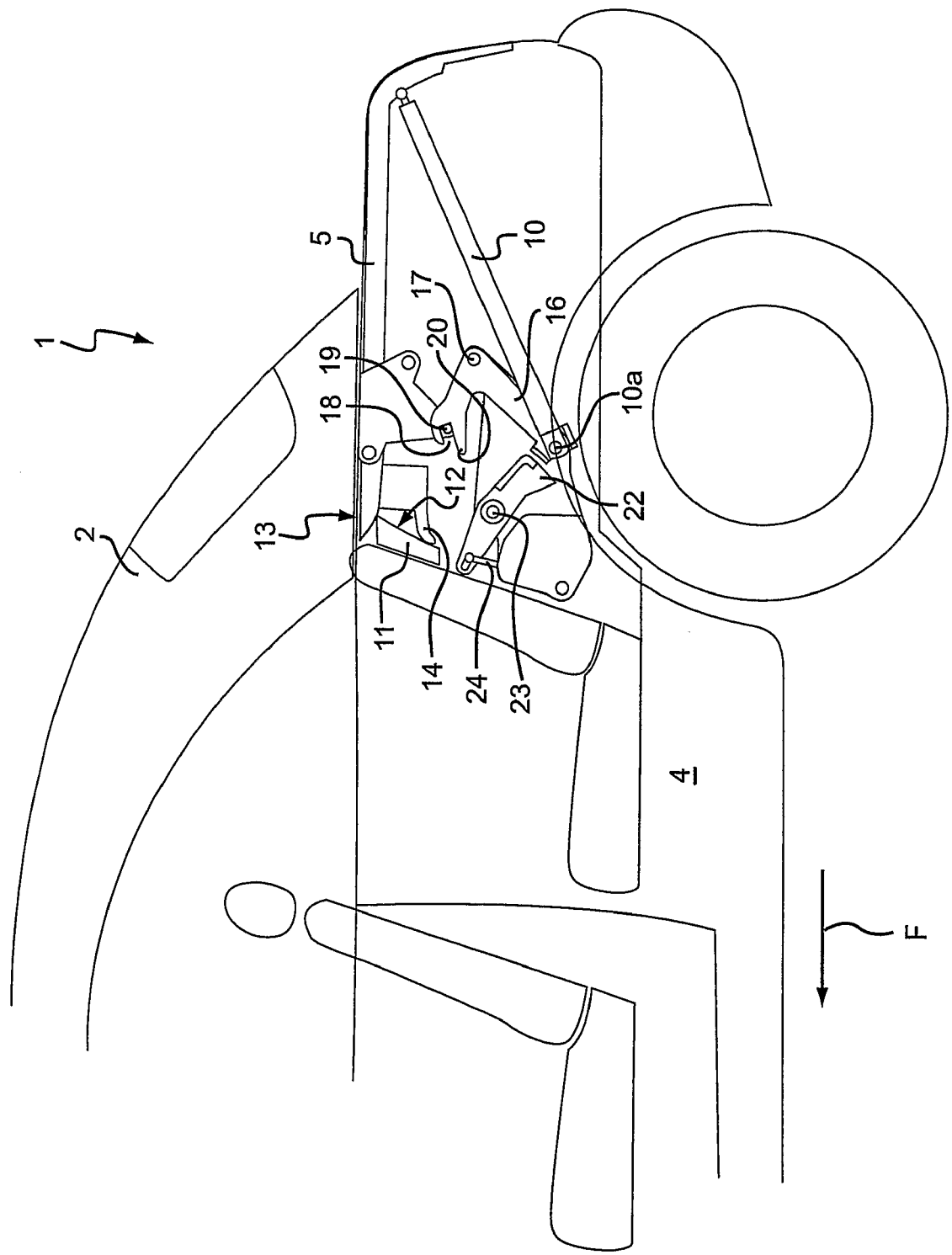
Figure 7:
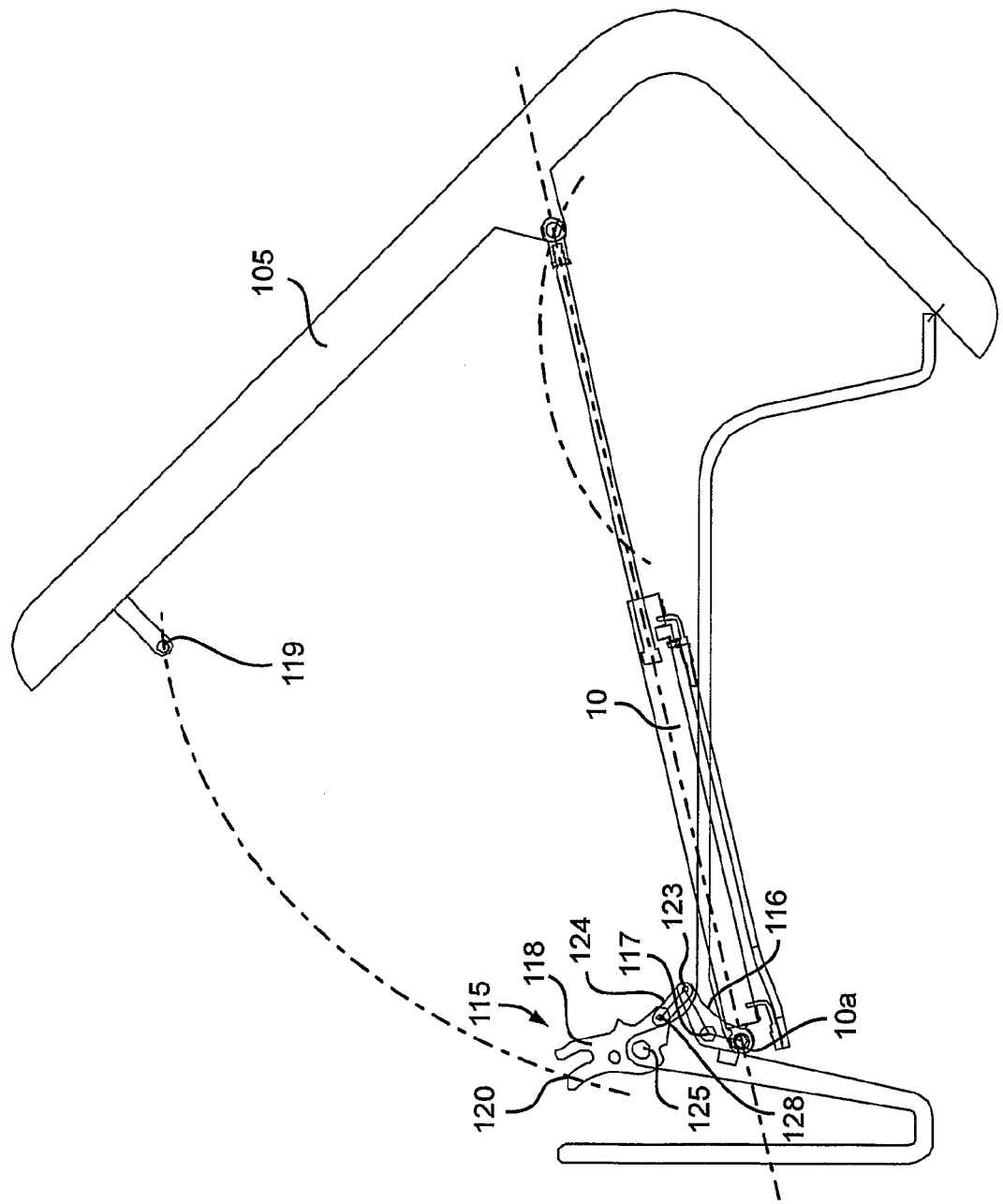
Figure 8:
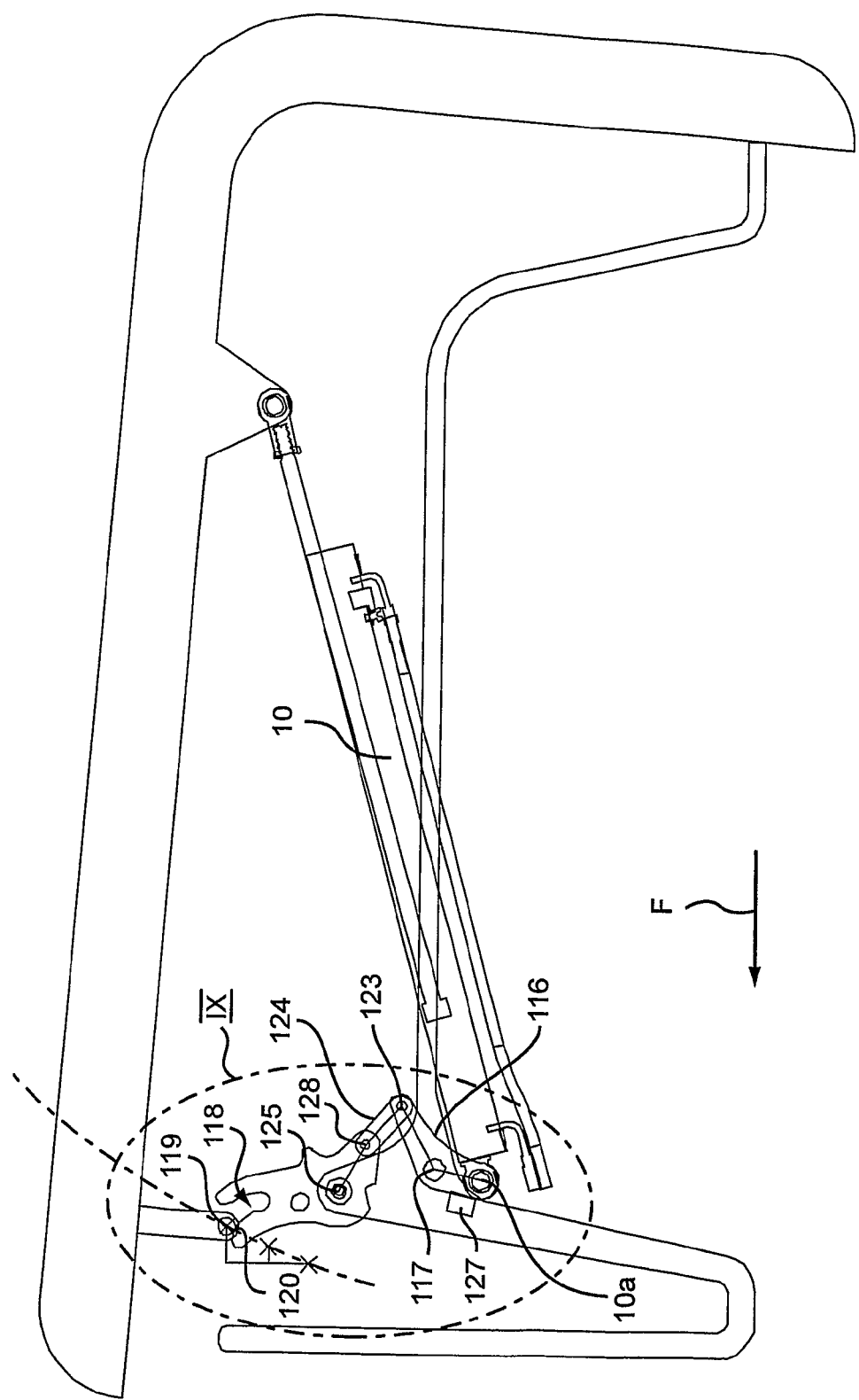
Figure 9:
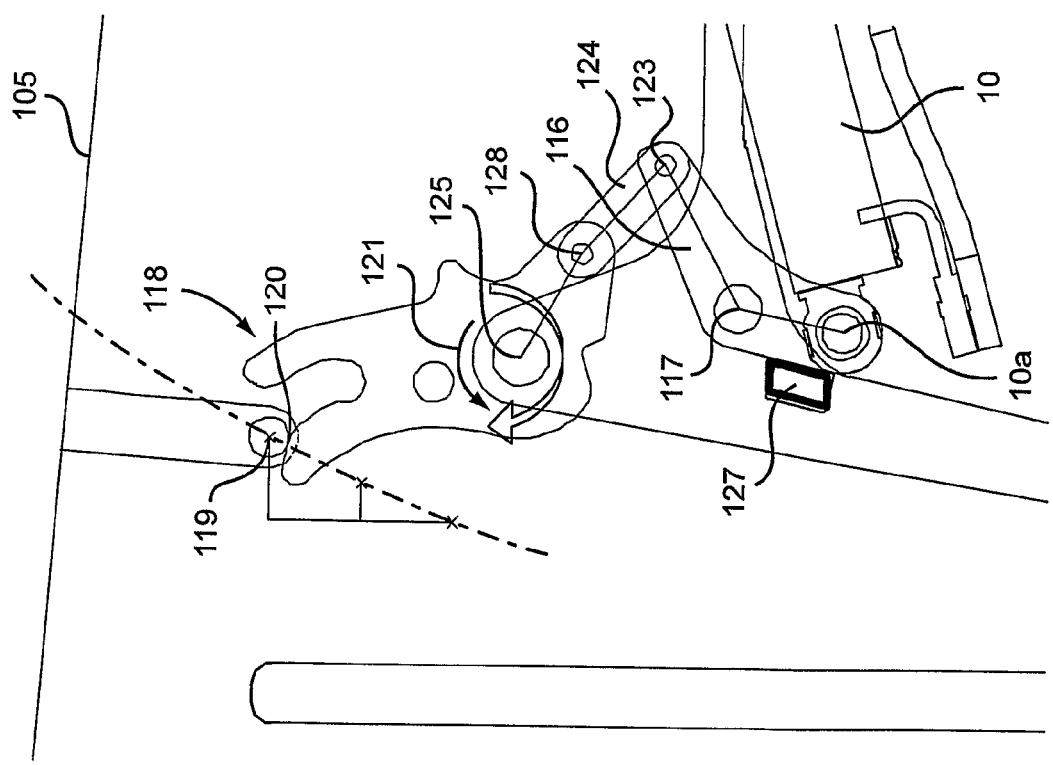
Figure 10:
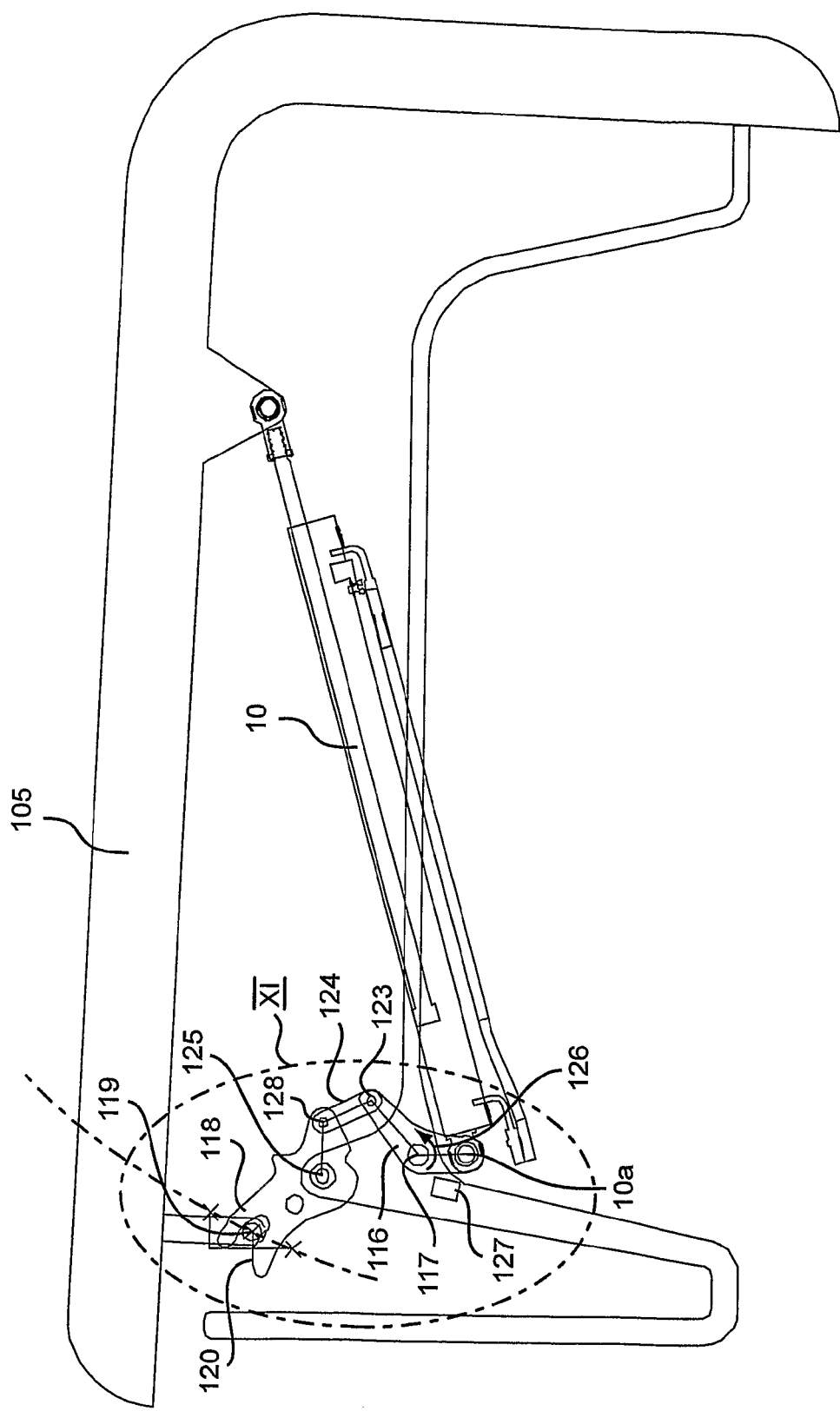
Figure 11:
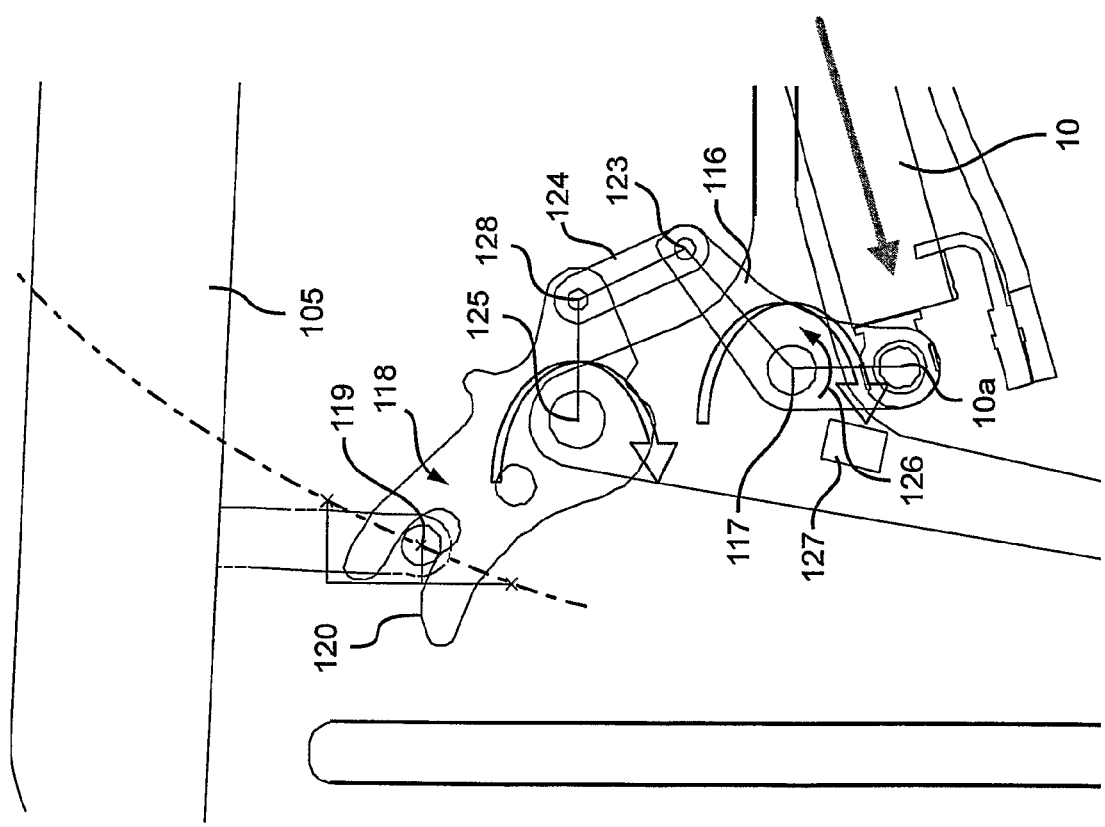
Figure 12:
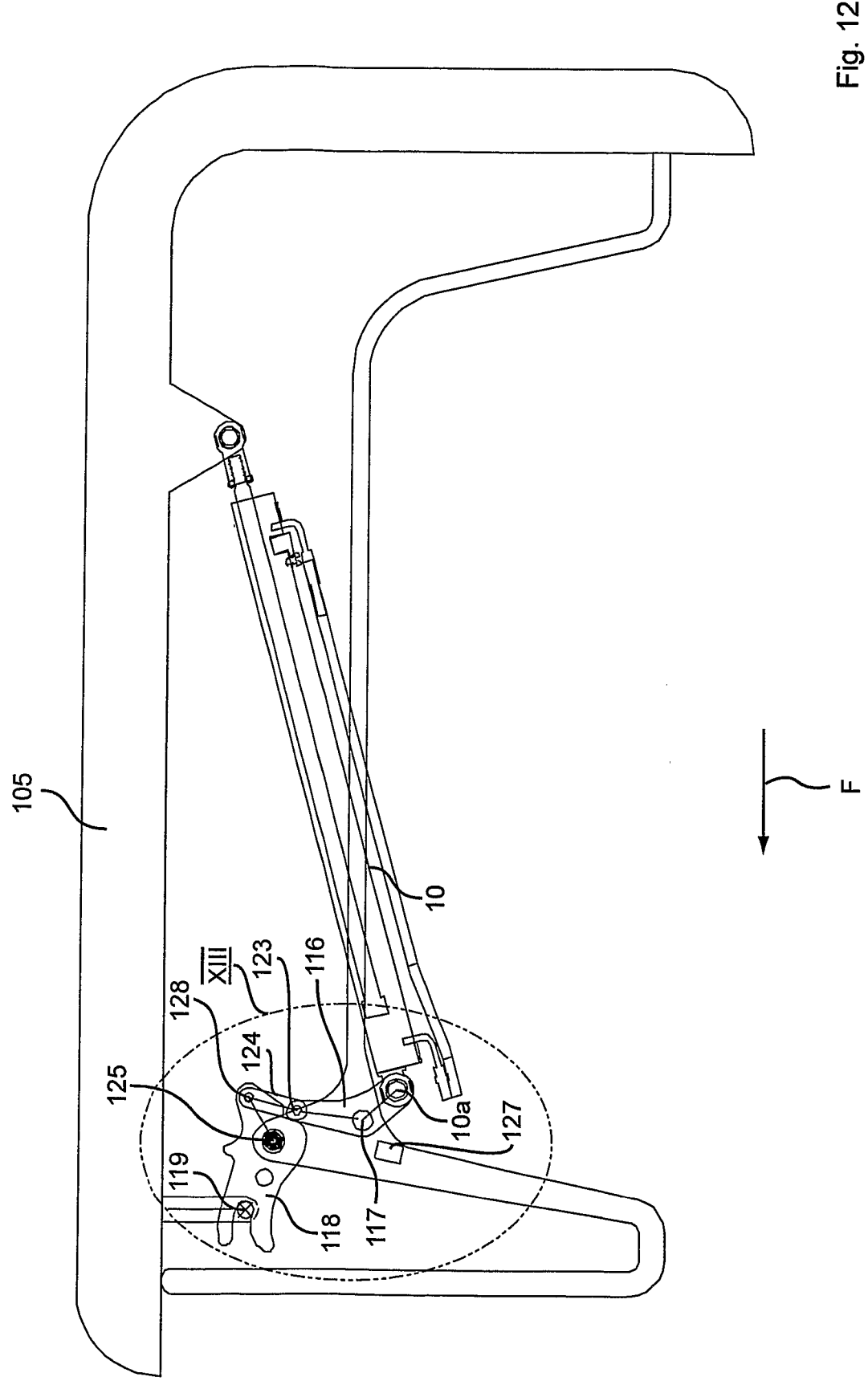
Figure 13:
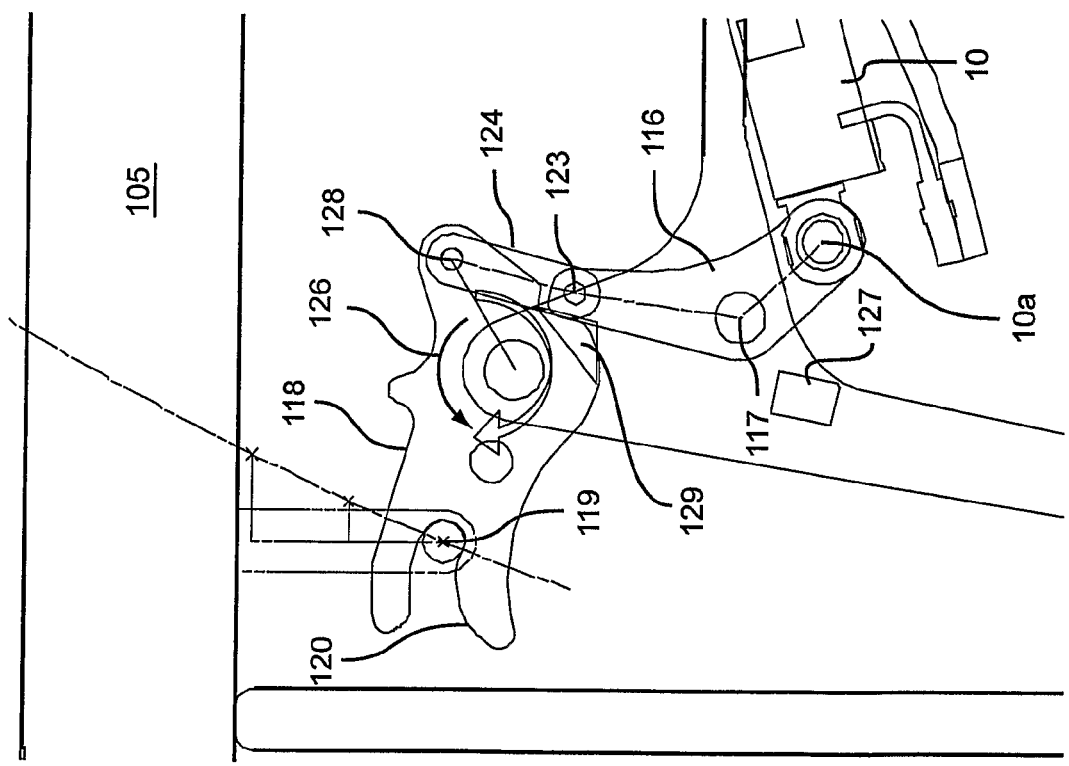
Figure 14:
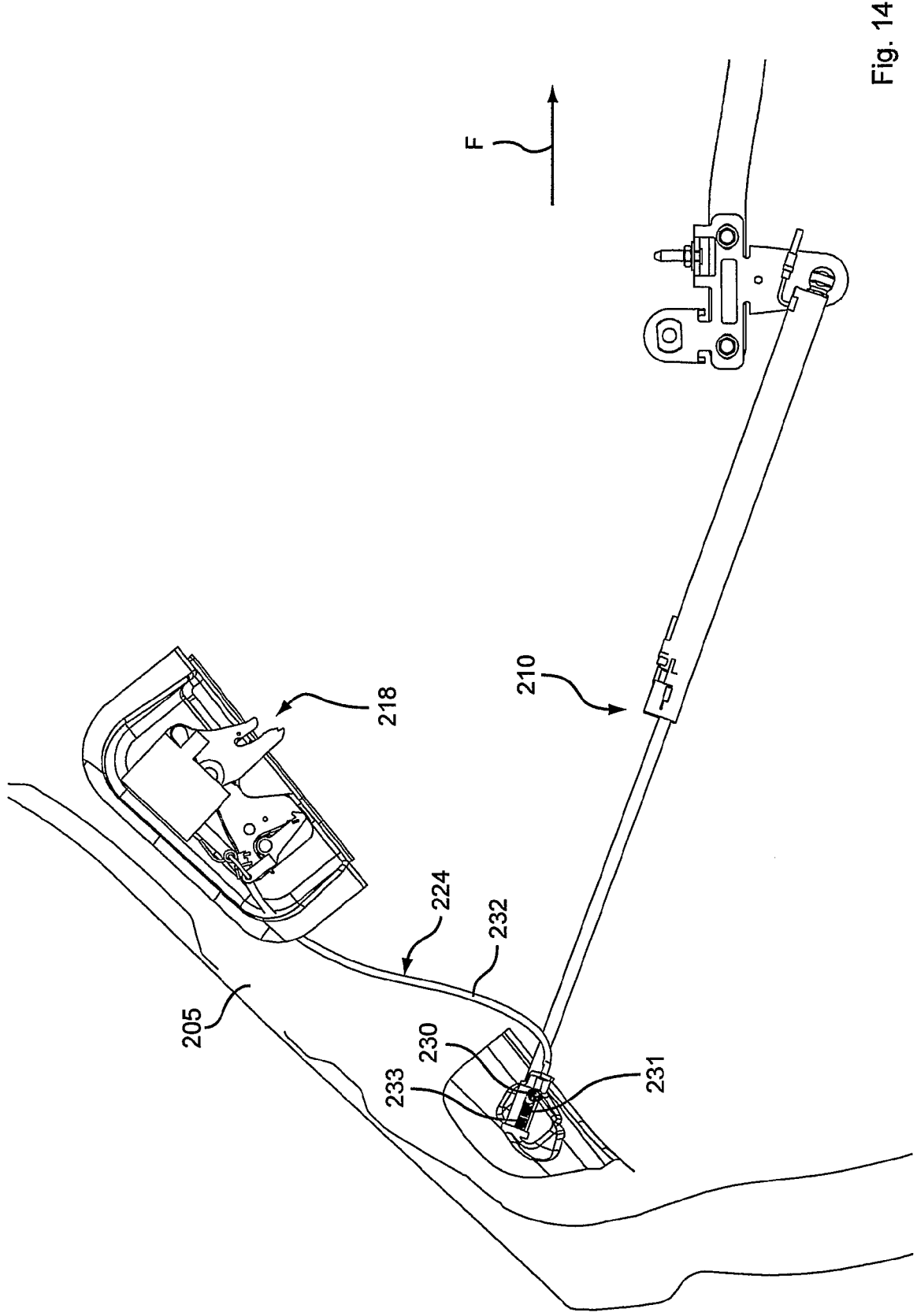
Figure 15:
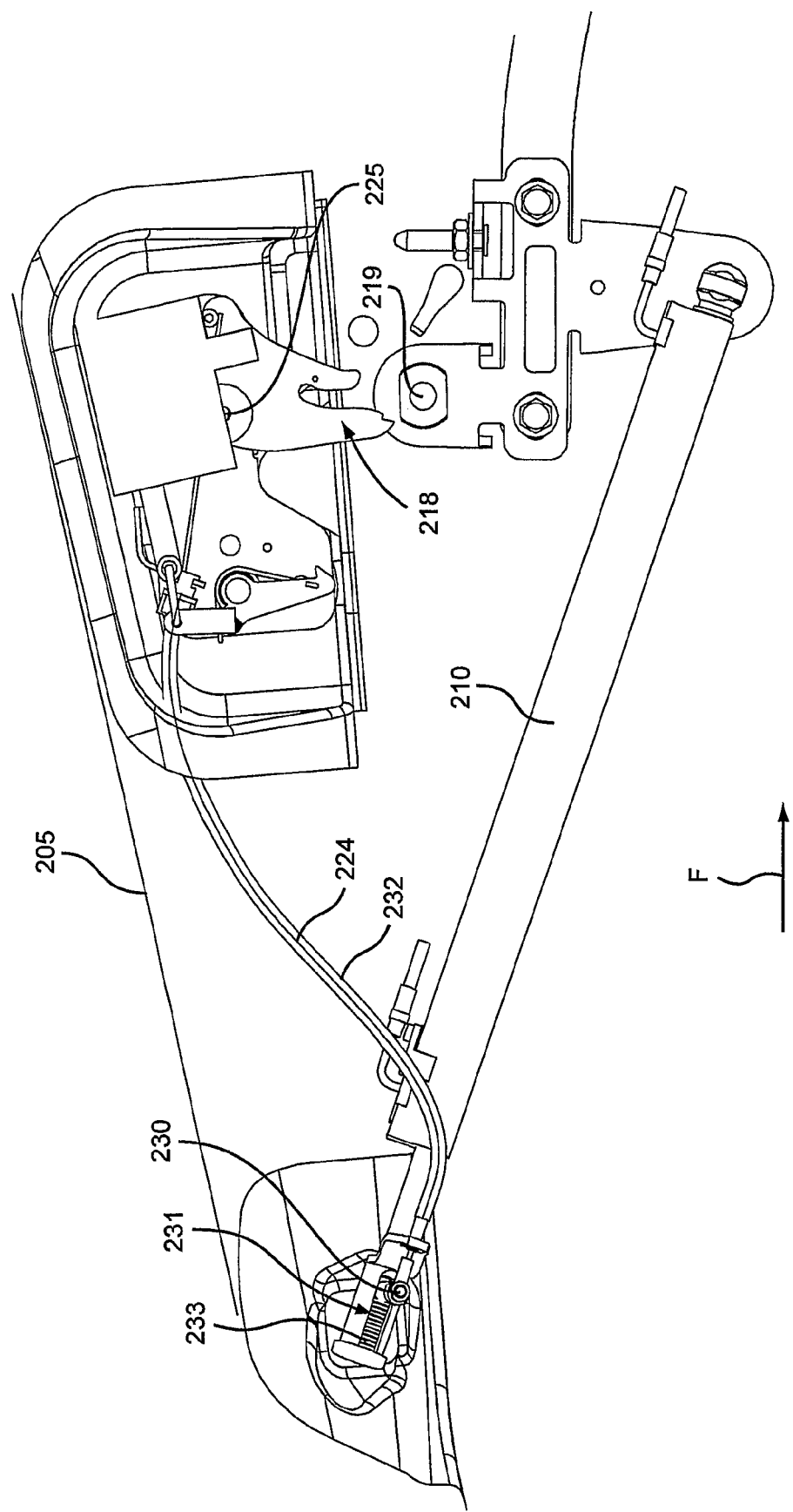

In the final phase of the movement to close the cover section 5, the pin 19, by virtue of its downward motion, encounters the lower fork arm 20 of the gripper 18 and pivots it, thereby also pivoting the control arm 16 in the direction of the arrow 21. With this, the articulated joint 10a of the hydraulic cylinder 10 comes into line (FIG. 4) with the axis 17 of the control arm 16 that is fixed to the body (dead-center position), so that when the hydraulic cylinder 10 is further retracted, the power pull-down device 15 reaches a position that is beyond dead center (FIGS. 5, 6).

To secure the closed position (FIG. 6), a remotely actuatable lock 22 is provided, which in the locking direction here is acted upon by a spring, and along which the control arm 16 glides when the cover section 5 is being closed. Once the control arm 16 has been shifted far enough downward, the lever of the lock 22 pivots around its axis 23 so as to block any return movement of the control arm 16 and thus also of the power pull-down device 15. The lock 22 can be released via an actuating element 24.

In the second exemplary embodiment according to FIGS. 7 through 13, the power pull-down device 115, which in this case also actively draws the cover section 105 downward, can be actuated directly via the hydraulic cylinder 10 and can be seamlessly integrated into its sequence of motions without a separate control mechanism, which is particularly favorable to a simple construction and trouble-free operation.

In this case, the power pull-down device 115 comprises a first short and, for example, V-shaped pivoting control arm 116, which is capable of pivoting around a stationary transverse vehicle axis 117 on the vehicle body. The hydraulic cylinder 10 is movably held to this axis via the joint 10a. The pivoting control arm 116 comprises, at the end of its leg that faces away from the articulated joint 10a, an articulated joint 123 for an adapter lever 124, which in turn is movably connected via the joint 128 to a gripper 118, which is also fork-shaped in this case. Said gripper is provided for interaction with a companion element 119 of the cover section 105, according to the principle of the first exemplary embodiment. The very short lever 116, 124 allows the structural space required in the longitudinal direction of the vehicle to be kept very small.

During the final phase of the movement to close the cover section 105 (FIG. 8 ff.) the pin 119, by virtue of its downward motion, strikes the front fork arm 120, relative to the direction of travel F, of the essentially vertical gripper 118 and pivots said gripper around the axis 125 in the direction of the arrow 121, against the force of a spring that is holding it in the opened position. In so doing, it draws the intermediate lever 124 along with it (transition from FIGS. 8 and 9 to FIGS. 10 and 11). At the same time its lower articulated joint 123 is pivoted around the axis 117 in the direction of the arrow 126 by virtue of the further retraction of the hydraulic cylinder 10 and the pivoting of the control arm 116 around the axis 117, and is shifted upward. This causes the control arm 116 to become detached from its position on the stop 127. The connecting joint 123 thereby reaches behind the direct line of connection between the joints 123 and 128 (FIG. 12, FIG. 13), where it is pressed against a second stop 129. The power pull-down device 115 is then in a position beyond dead center, so that tractive force applied to the front end of the cover section 5 in the opening direction causes the joint 123 to be pressed even more forcefully against the stop 129, and causes the hydraulic cylinder 10 to be acted upon in the closing direction, resulting in an additional securing of the cover in its closed position. A special lock for securing the closed position can then be dispensed with.

In the first two exemplary embodiments, the power pull-down device 15, 115 can be moved directly or via the hydraulic cylinder in close proximity to its retracted position. In either case, an adapter lever 124, connected to the gripper 118, can be provided near the control arm 16, 116, on which the drive element 10 is arranged.

In the third exemplary embodiment, in contrast, a control cable connection 224 is connected between the hydraulic cylinder 210 and the gripper 218, wherein in this case the gripper can also be assigned to the cover section 205, although this is not imperative. The control cable 224 is held on a pin 230 of the cover section 205, which is situated in a gate opening 231 for the piston rod of the hydraulic cylinder 210, and in relation to which the control cable sheath 232 that is held on the piston rod of the hydraulic cylinder 210 can be moved.

During closure of the cover section 205, despite the retraction of the piston rod of the hydraulic cylinder 210, the relative position between the gate opening 231 and the pin 230 at first remains unchanged by virtue of the force of the spring 233. Only shortly before the closed position is reached is the spring 233 pressed in by virtue of the continued retraction of the piston rod, wherein the gate opening 231 is drawn essentially forward in the direction of travel F in relation to the pin 230. This then results in a relative movement between the control cable 224 and the control cable sheath 232, which effects the pivoting of the gripper 218, which in this case is assigned to the cover section 205.

Figure 16:
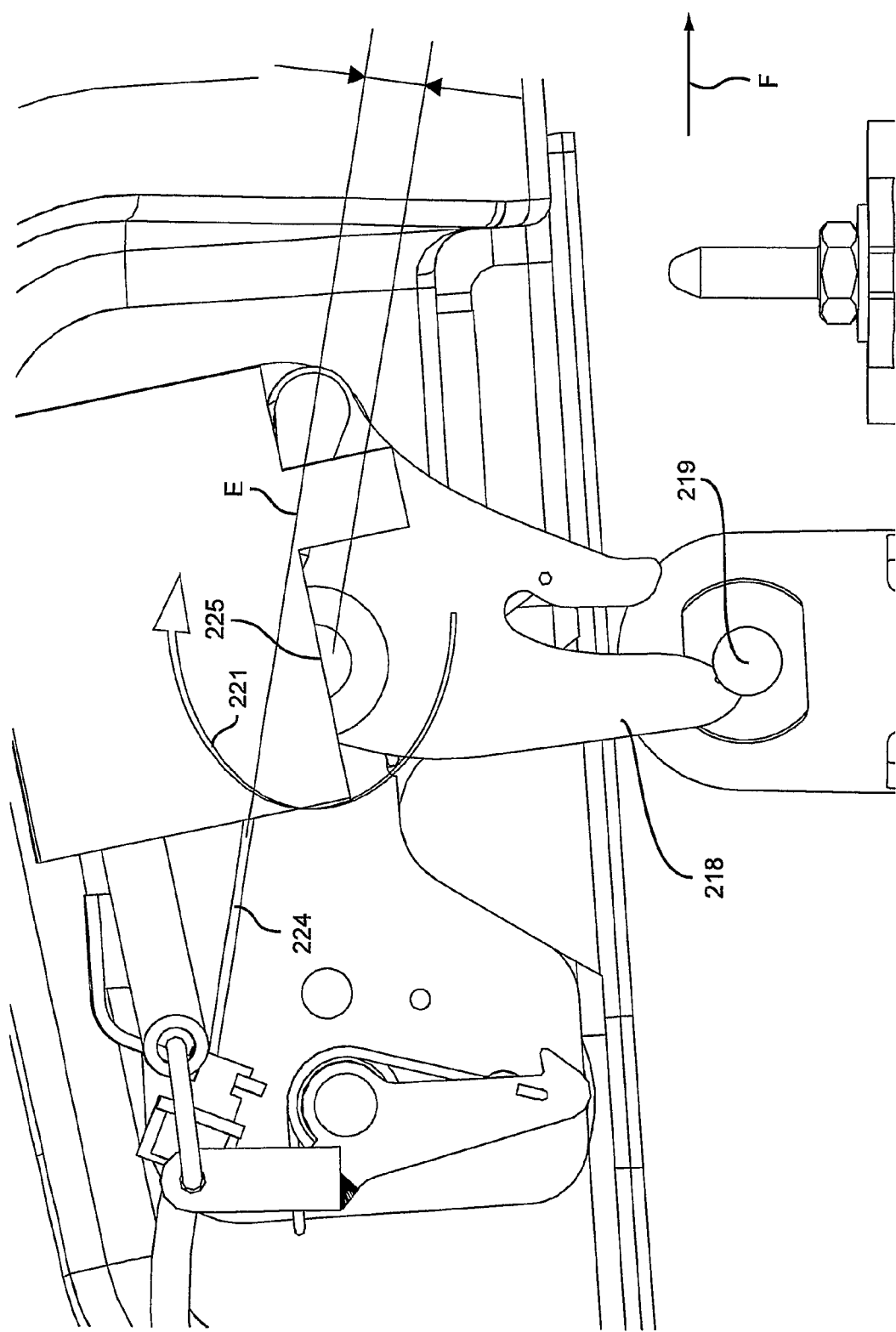
Figure 17:
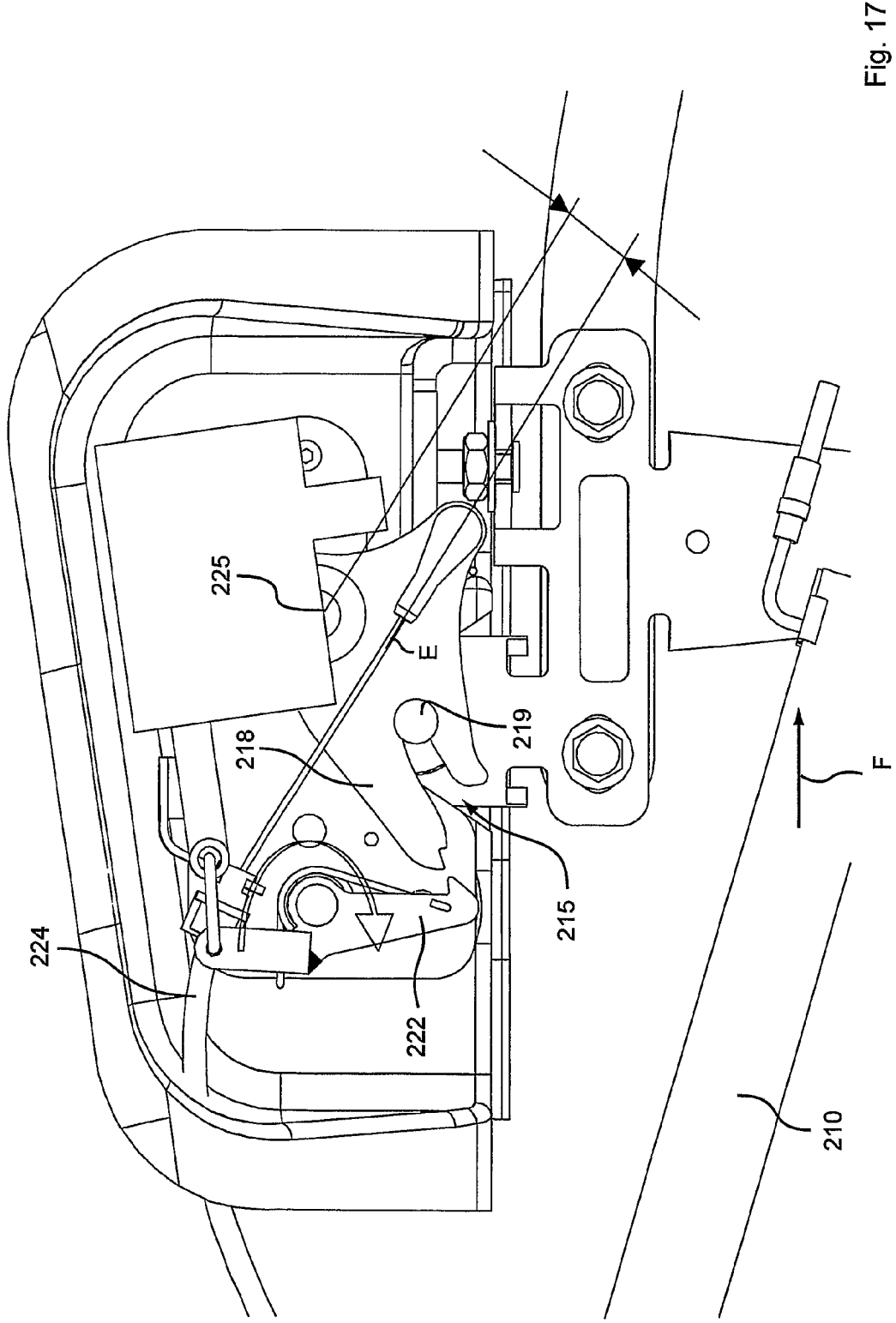

The downward movement of the cover section 205 causes the gripper 218 to strike the pin 219, which in this case is allocated to the body. The movement of the control cable described above causes the gripper 218 to pivot around the axis of the joint 225 in the direction of the arrow 221. This joint 225 thereby reaches (transition from FIG. 16 to FIG. 18) the far side of the line of extension E of the control cable 224 (transition from FIG. 16 to FIG. 17). In this case as well, the power pull-down device 215 is then in a position beyond dead center, and can also be secured in this closed position via a lock 22 in the form of a locking pawl (FIG. 18).

While the best modes for carrying out the invention have been described in detail, those familiar with the art to which this invention relates will recognize various alternative designs and embodiments for practicing the invention within the scope of the appended claims.

The invention claimed is:

1. Motor vehicle (1) with a roof (2) that is at least partially movable and can be stowed in the body (4) beneath a cover section (5; 105), wherein said cover section (5; 105) can be moved upward in a pivoting motion, opening up toward the rear to reveal a stowage opening (3) for sections of the roof or for the entire roof (2) and can be moved downward in a pivoting motion to cover the stowage opening (3), characterized in that for the opening and closing movement, a drive element (10) is provided that lies essentially in a longitudinal vertical plane of the vehicle, and a movable power pull-down device (15; 115) is rotatably connected to said drive element (10) at a joint (10a), wherein when said drive element is in close proximity to its retracted position said drive element (10) actuates said movable power pull-down device (15; 115) for the cover section (5; 105), which comprises at least one pivoting control arm (16; 116) directly and pivotally connected to the body (4) about a stationary transverse axis (17) on the body, by pivoting the cover section (5; 105) into contact with the pivoting control arm (16; 116) to act on the pivoting control arm (16; 116) to pivot the pivoting control arm (16; 116) about the stationary transverse axis (17) such that the cover section (5; 105) is closed over the stowage opening (3).

2. Motor vehicle (1) according to claim 1 with an at least partially movable roof (2) that can be stowed in the body (4) beneath said cover section (5; 105; 205), wherein said cover section (5; 105; 205) can be moved upward in a pivoting motion, opening upward toward the rear to reveal a stowage opening (3) for the roof sections or for the entire roof (2), characterized in that said movable power pull-down device (15; 115; 215) for the cover (5; 105; 205) is held in a position that is beyond dead center when the drive element (10; 210) is fully retracted.

3. Motor vehicle (1) according to claim 2, characterized in that an external introduction of force on the cover section (105; 205) in the opening direction acts upon the drive element (10; 210) in the direction of retraction.

4. Motor vehicle (1) according to claim 1, characterized in that the power pull-down device (15; 115) comprises a gripper (18; 118), which in the final phase of closure of the cover section (5; 105) can be pivoted by the retraction of the drive element (10), thereby drawing an accommodated companion piece (19; 119) of the cover section (5; 105) downward.

5. Motor vehicle (1) according to claim 1, characterized in that the drive element is configured as a hydraulic cylinder (10), which is held on a control arm (16; 116) that is capable of pivoting around a stationary axis (17; 117) on the body.

6. Motor vehicle (1) according to claim 1, characterized in that when the cover section (5; 105; 205) is at an opening angle of less than 10° from horizontal, the drive element (10; 210) itself is inclined less than 30° from horizontal.

7. Motor vehicle (1) according to claim 1, characterized in that a remotely actuatable lock (22; 222) is provided for securing the closed position of the cover section by blocking the movement of the power pull-down device (15).

8. Motor vehicle (1) according to claim 5, characterized in that at least one force reversing adapter lever (124) is provided between the pivoting control arm (116), on which the hydraulic cylinder (10) is supported, and the power pull-down device (115).

9. Motor vehicle (1) according to claim 1, characterized in that the space for moving the pivoting control arm (16; 116) and for moving an adapter lever (124) is limited by at least one stop (127; 129) that is fixed to the body.

10. Motor vehicle (1) according to claim 1, characterized in that the cover section (5; 105; 205) can be moved upward in a second, opposite pivoting direction to reveal an opening for loading and unloading luggage.

11. Motor vehicle (1) according to claim 1, characterized in that said vehicle is a convertible vehicle with said roof being fully retractable.

* * * * *